United States Patent [19]

Ohmura

[11] 4,051,618
[45] Oct. 4, 1977

[54] LINE GUIDE ASSEMBLY FOR FISHING RODS

[76] Inventor: Ryuichi Ohmura, No. 19-3, Minami-cho, Shizuoka, Shizuoka, Japan

[21] Appl. No.: 699,232

[22] Filed: June 24, 1976

[51] Int. Cl.² .............................................. A01K 87/04
[52] U.S. Cl. ............................................................ 42/24
[58] Field of Search .................... 43/24, 25, 25.2, 18 R

[56] References Cited
FOREIGN PATENT DOCUMENTS

| 2,263,686 | 10/1975 | France ........................................ 43/24 |
| 1,383,521 | 2/1975 | United Kingdom ..................... 43/24 |
| 326,343 | 3/1930 | United Kingdom ..................... 43/24 |
| 1,364,789 | 8/1974 | United Kingdom ..................... 43/24 |
| 1,218,143 | 1/1971 | United Kingdom ..................... 43/24 |

Primary Examiner—Warner H. Camp
Attorney, Agent, or Firm—Holman & Stern

[57] ABSTRACT

Integral single or double body structures of a line guide frame formed by application of stamping to a metallic plate combined with a seat tube made of an elastic material such as synthetic resins assures successful elimination of trouble conventionally caused by brazing of junctions, damage on the rod surface and a breakage caused by degradation of the synthetic resinous parts.

10 Claims, 6 Drawing Figures

U.S. Patent   Oct. 4, 1977   4,051,618
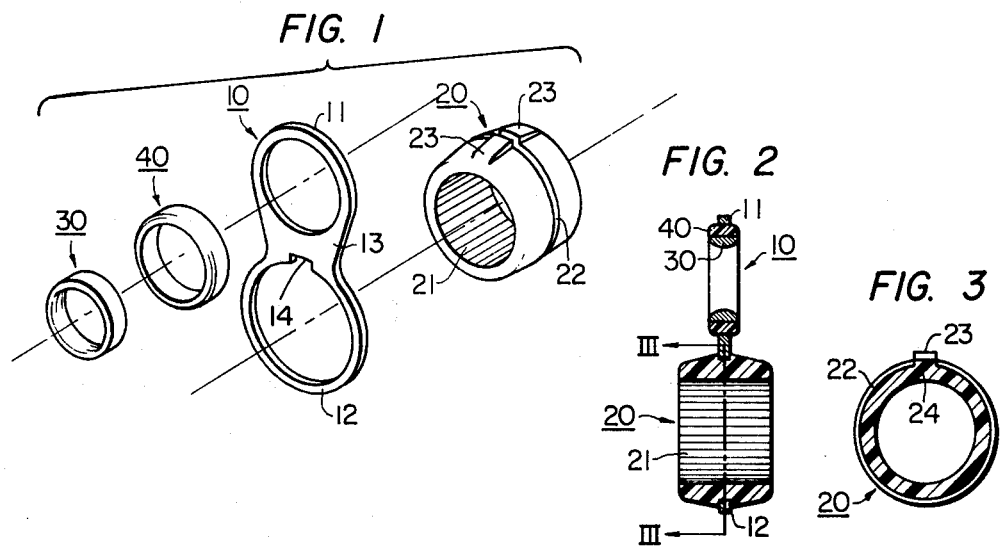
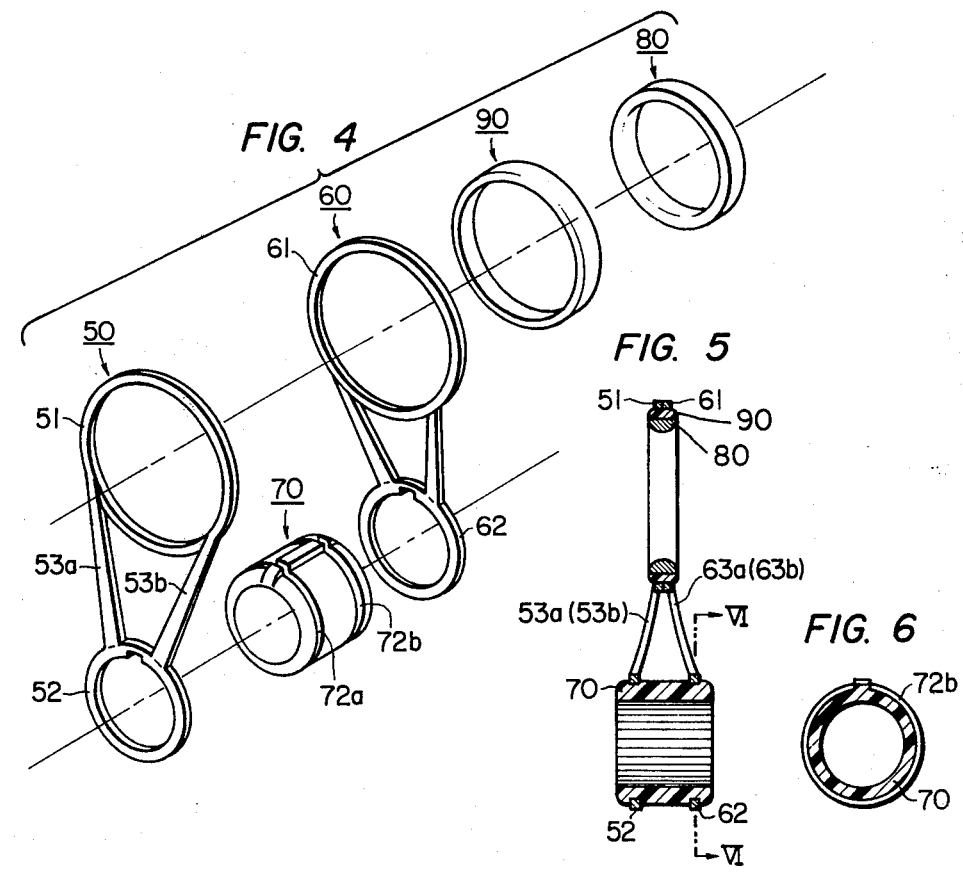

4,051,618

LINE GUIDE ASSEMBLY FOR FISHING RODS

FIELD OF THE INVENTION

The present invention relates to improved line guide assembly for fishing rods.

BACKGROUND OF THE INVENTION

Most of the conventional line guide assemblies for fishing rods are made of metallic materials and junction of component elements is carried out by brazing, which disadvantageously and inevitably causes annealing of the material at joined portions and their surroundings resulting in lowering of the strength of the material. In order to compensate this lowering in the strength, it is necessary to provide the assembly with a thick construction, which undesirably leads to increase in the weight. In addition, when the assembly of this type is adapted for detachable insertion over fishing rods, the metallic seat tube part of the assembly tends to mar or damage the rod surface.

Another type of conventional line guide assembly is known also, which is in the form of an integral single body made of synthetic resins accompanied with a line guide ring made of a material of high abrasion resistance such as metal or ceramics. This type of line guide assembly may be free of the trouble of damage on the rod surface. However, its relatively bulky construction tends to increase pneumatic resistance, thus hindering smooth action in operating the fishing rods. Further, gradual degradation of the synthetic resin may result in an unexpected breakage of the synthetic resinous parts.

SUMMARY AND OBJECTS OF THE INVENTION

The primary object of the present invention is to provide an improved line guide assembly for fishing rods which is free of troubles conventionally caused by brazing the junction of elements.

Another object of the present invention is to provide an improved line guide assembly for fishing rods which gives no damage to rod surfaces when mounted to the fishing rods.

Another object of the present invention is to provide an improved line guide assembly for fishing rods of relatively compact construction.

A further object of the present invention is to provide an improved line guide assembly for fishing rods which eliminate breakage caused by degradation of the synthetic resinous parts.

In order to attain the above-described objects, the line guide assembly in accordance with the present invention includes, as major elements, a frame made of a metallic material and a seat tube made of a synthetic resinous material. The frame is of an integral single body construction preferably made by application of mechanical stamping to a metallic plate. The frame is further comprised of a guide ring part adapted for passage of fishing lines and a seat ring part to be forcedly inserted over the seat tube.

In a preferred embodiment, the frame may be comprised of a pair of frames.

Further features and advantages of the present invention will be made clearer from the following description, reference being made to the embodiments shown in the accompanying drawings, in which;

DESCRIPTION OF THE FIGURES OF THE DRAWING

FIG. 1 is a perspective view of the first embodiment of the present invention in a disassembled state, FIG. 2 is a sectional side view of the assembly shown in FIG. 1, FIG. 3 is a section taken along the line III—III in FIG. 2, FIG. 4 is a perspective view of the second embodiment of the present invention in a disassembled state, FIG. 5 is a sectional side view of the assembly shown in FIG. 4, and FIG. 6 is a section taken along the line VI—VI in FIG. 5.

DESCRIPTION OF THE PREFERRED EMBODIMENTS

An embodiment of the fishing line guide assembly in accordance with the present invention is shown in FIG. 1, in which the disassembled elements comprise a main frame 10 and a seat tube 20 to be combined with the main frame 10 as later described in detail.

The main frame 10 is of an integral structure formed by application of stamping to a metallic plate and comprised of a guide ring 11, a seat ring 12 and an arm 13 for connecting the two rings 11 and 12. The guide ring 11 is used for passing the fishing line therethrough whereas the seat ring 12 is used for coupling with the seat tube 20.

For passing the fishing line, the guide ring 11 may by used either independently or in combination with an additional guide ring 30 and a cushion ring 40. Usually, the additional guide ring 30 is made of a material of a high abrasion resistance such as ceramics and the cushion ring 40 is made of an elastic material such as synthetic resins, the cushion ring 40 being or interposed between the guide ring 11 of the main frame 10 and the additional guide ring 30.

The seat tube 20 is made of an elastic material such as synthetic resins and provided with knurling 21 in the inner periphery thereof and an annular groove 22 in the outer periphery thereof. The annular groove 22 is adapted for coupling with the seat ring 12 of the main frame 10. Thus, the outer diameter of the bottom of the annular groove 22 is almost the same as the inner diameter of the seat ring 12 of the main frame 10 and the outermost diameter of the seat tube 20 is naturally larger than the inner diameter of the seat ring 12. However, due to the elastically deformable nature of the seat tube 20, the seat ring 12 can be forcedly coupled with the seat tube 20 and rests in the annular groove 22 of the latter. (see FIG. 2)

In order to assure a stable coupling of the main frame 10 with the seat tube 20, a radial recess 14 is formed at a upper position in the inner periphery of the seat ring 12 and a radial projection 24 is formed at a corresponding position on the bottom surface of the annular groove 22 as shown in FIG. 3. In the coupled state of the main frame 10 with the seat tube 20, the projection 24 of the latter is snugly received in the recess 14 of the former to hinder axial turning of the two members 10 and 20. In order to attain a correct coupling of the main frame 10 and the seat tube 20, axially elongated projections 23 are formed on the outer surface of the seat tube 20 in alignment with the projection 24 in the annular groove 22. In the coupling, the seat ring 12 is inserted over the seat tube 20 in such a way that the recess 14 of the seat ring 12 meets either one of the axial projections.

Thus the collimation of the recess 14 with the projection 24 in the annular groove 22 is carried out very simply and quite automatically.

Another embodiment of the fishing line guide assembly in accordance with the present invention is shown in FIG. 4, in which it is required that the distance between the line guide part and the fishing rod should be larger than that in the embodiment shown in FIG. 1.

In the case of this embodiment, the assembly includes, a first frame 50, a second frame 60 and a seat tube 70 to be combined with the frames 50 and 60, an additional guide ring 80 and a cushion ring 90 as later described in detail.

The first frame 50 is of an integral structure formed by application of stamping to a metallic plate and comprised of a guide ring 51, a seat ring 52 and a pair of arms 53a, 53b for connecting the two rings 51 and 52. The guide ring 51 is used for passing the fishing line therethrough whereas the seat ring is used for coupling with the seat tube 70. The construction of the other frame 60 is the same as that of the above-described first frame 50.

The construction of the seat tube 70 is substantially similar to tube 20 of the first embodiment except that a pair of axially separated annular grooves 72a and 72b are provided in the outer periphery thereof; the additional guide ring 80 and the cushion ring 90 are indispensable for this embodiment.

In building up of the assembly, the seat rings 52 and 62 of the frames 50 and 60 are forcedly rendered to respectively rest in the annular grooves 72a and 72b of the seat tube 70 and the guide rings 51 and 61 are placed in an end surface flush contact with each other as shown in FIG. 5. Secondly, the cushion ring 90 is inserted into the guide ring 51 and 61. Thirdly, the additional ring 80 is forcedly inserted into the cushion ring 90, thereby the guide rings 51 and 61 being firmly bound to each other.

It is necessary that the annular grooves 72a and 72b are axially distant from each other to such an extent that, in the coupled state of the two frames 50 and 60, the arms 53a and 63a, and the arms 53b and 63b and the outer surface of the seat tube 70 should establish triangular structures which increases their a strength against application of external forces.

As a substitute for the additional guide ring 80 and the cushion ring 90, a metallic eyelet ring (not shown) may be used for coupling the two guide rings 50 and 60.

In accordance with the present invention, the main frame 10 in the first embodiment and the frames 50, 60 in the second embodiment are both in the form of integral single bodies without any brazed part. Thus the line guide assembly of the present invention is quite free from troubles caused by brazing at junctions which is encountered in the case of the conventional line guide assemblies. The seat tube 20 (or 70) is made of an elastic material such as a synthethic resin which gives almost no damage to fishing rods when it is attached to them. The elastically deformable nature of the seat tube allows the tube to be stably mounted to fishing rods of tapered type. Degradation of the synthetic resinous seat tube during long use can be mitigated remarkably by covering of the same by the seat ring of the frame. Further, when the second embodiment in FIG. 4 is employed, the triangular structure assures durability against external load application.

What is claimed is;

1. An improved line guide assembly for fishing rods comprising, in combination, a seat tube to be inserted over said fishing rods and made of an elastic material and a metallic frame made up of a pair of frame halves coupled to each other at their end surfaces each of which is an integral single body made by stamping of a metallic plate and includes a guide ring part for passing fishing lines therethrough, a seat ring part firmly inserted over said seat tube and an arm part for connecting said two ring parts, said seat tube being provided with a pair of annular grooves in the outer periphery thereof in which said seat ring parts of said frame halves are snugly received.

2. An improved line guide assembly as claimed in claim 1 in which radial projections are formed at proper positions on the bottom of said annular grooves, respectively, and radial recesses are formed at corresponding positions in the inner peripheries of said seat ring parts of said frame halves.

3. An improved line guide assembly as claimed in claim 5 in which said guide ring parts of said frame halves are coupled to each other by an eyelet.

4. An improved line guide assembly as claimed in claim 5 in which said guide ring parts of said frame halves are coupled to each other by a cushion ring and an additional guide ring.

5. An improved line guide assembly for fishing rods comprising, in combination:
   a seat tube for telescopic receipt onto a fishing rod, said seat tube comprising an elastic material and including at least one annular groove in the other periphery thereof for providing mounting means; and
   metallic frame means comprising at least one, one-piece metallic plate including a guide-ring part for receiving a fishing line therethrough, a seat-ring part formed integral with an arm-part formed integral with said guide-ring part and comprising said one-piece metallic plate, said seat-ring part being firmly circumposed within the annular groove of said seat tube, said seat tube and seat-ring parts respectively having portions of cooperating locking means lockingly-engaging and preventing relative rotation between said metallic frame means and said seat tube, said seat tube including on the outer periphery thereof, in axial alignment with said cooperating locking means, means in alignment with a portion of the cooperating locking means within said annular groove of the seat tube for orienting the seat-ring part into assembled and locked engagement on said seat tube.

6. The structure as claimed in claim 5 in which said cooperating locking means comprises a radial recess in said seat-ring part and extending in substantial bisecting relation to said guide-ring part, and a radially projecting portion on said seat tube within said annular groove for receiving the radial recess in said seat-ring part.

7. The structure as claimed in claim 6 in which said means in axial alignment with said locking means comprises axially disposed projections on the outer surface of said seat tube in axial alignment with the radial projection within said annular groove.

8. The structure as claimed in claim 5 in which said guide-ring part comprises an outer metal ring circumposed about a cushion ring of an elastic material and an inner guide ring of a high abrasion-resistance material disposed within said cushion ring.

9. The structure as claimed in claim 5 in which said metallic frame means comprises a pair of one-piece metallic plates, juxtaposed at the guide-ring parts, said arm parts diverging axially from said juxtaposed guide-ring parts and terminating in said seat-ring parts, said seat-ring parts being spaced axially, said seat tube having a pair of axially spaced, annular grooves in the outer periphery thereof, the seat-ring parts of the respective pair of metallic plates of said frame means being secured in said axially, spaced annular grooves of the seat tube.

10. The structure as claimed in claim 9 in which said juxtaposed guide-ring parts of the pair of one-piece metallic plates are circumposed about in juxtaposed relation on a resilient cushion ring of an elastic material, said cushion ring of elastic material being circumposed about an inner guide ring of a high abrasion-resistance material.

* * * * *